United States Patent
Uwazumi et al.

(10) Patent No.: US 6,716,543 B2
(45) Date of Patent: Apr. 6, 2004

(54) MAGNETIC RECORDING MEDIUM AND METHOD FOR PRODUCING SAME

(75) Inventors: Hiroyuki Uwazumi, Kawasaki (JP); Tadaaki Oikawa, Kawasaki (JP); Naoki Takizawa, Kawasaki (JP)

(73) Assignee: Fuji Electric Co., Ltd., Kawasaki (JP)

( * ) Notice: Subject to any disclaimer, the term of this patent is extended or adjusted under 35 U.S.C. 154(b) by 69 days.

(21) Appl. No.: 09/789,929

(22) Filed: Feb. 22, 2001

(65) Prior Publication Data

US 2001/0041273 A1 Nov. 15, 2001

(30) Foreign Application Priority Data

Feb. 23, 2000 (JP) ........................ 2000-046473
Apr. 25, 2000 (JP) ........................ 2000-124853

(51) Int. Cl.$^7$ .............................. G11B 5/66; G11B 5/70
(52) U.S. Cl. ............................. 428/694 TS; 428/611; 428/660; 428/668; 428/900; 427/128; 427/131; 427/132
(58) Field of Search ................. 428/694 TS, 900, 428/611, 660, 668; 427/128, 131, 132

(56) References Cited

U.S. PATENT DOCUMENTS

| | | | |
|---|---|---|---|
| 5,679,473 A | 10/1997 | Murayama et al. | ......... 428/694 |
| 5,736,262 A * | 4/1998 | Ohkijima et al. | ........... 428/611 |
| 5,846,648 A | 12/1998 | Chen et al. | ................. 428/332 |
| 5,968,679 A | 10/1999 | Kobayashi et al. | ......... 428/694 |
| 6,077,586 A * | 6/2000 | Bian et al. | ................. 428/65.3 |
| 6,143,388 A * | 11/2000 | Bian et al. | ................. 428/65.3 |
| 6,274,233 B1 * | 8/2001 | Yoshikawa et al. | ......... 428/332 |
| 6,420,058 B1 * | 7/2002 | Haratani et al. | ......... 428/694 T |
| 2002/0001736 A1 * | 1/2002 | Akimoto et al. | ......... 428/694 T |

FOREIGN PATENT DOCUMENTS

JP     08-255342     1/1996

OTHER PUBLICATIONS

Hitachi KK, JP 3317–922 A, Derwent Abstract Accession No. 89–044196/06, Dec. 26, 1988.
Hitachi Ltd., JP 06310329 A, Derwent Abstract Accession No. 95–025958/04, Nov. 4, 1994.

* cited by examiner

*Primary Examiner*—Holly Rickman
(74) *Attorney, Agent, or Firm*—Venable LLP; Marina V. Schneller

(57) ABSTRACT

The present invention provides a magnetic recording medium including at least a nonmagnetic undercoat layer, a nonmagnetic metallic intermediate layer, a magnetic layer, a protective film, and a liquid lubricant layer sequentially laminated on a nonmagnetic substrate, wherein the magnetic layer contains crystal grains having ferromagnetism and nonmagnetic grain boundaries surrounding the crystal grains, and the nonmagnetic metallic intermediate layer contains at least one layer, and the crystal structure of each layer being a hexagonal close-packed structure; and a method for producing the magnetic recording medium. The magnetic recording medium shows high coercive force Hc and a low medium noise, and its manufacturing cost is also low.

14 Claims, 4 Drawing Sheets

MAGNETIC RECORDING MEDIUM AND METHOD FOR PRODUCING SAME

This application is based on Japanese Patent Application Nos. 2000-46473 filed Feb. 23, 2000 and 2000-124853 filed Apr. 25, 2000, the contents of which are incorporated hereinto by reference.

BACKGROUND OF THE INVENTION

1. Field of the Invention

This invention relates to a magnetic recording medium, which is used in various magnetic recording medium devices including external storage devices of computers and AV-HDD, and a method for producing the magnetic recording medium.

2. Description of the Related Art

Various compositions and structures of a magnetic layer and various materials for a nonmagnetic undercoat layer and a seed layer have been proposed for magnetic recording media for which a higher recording density and a lower noise have rapidly been demanded in recent years. Particularly in recent years, a proposal has been made for a magnetic layer, generally called a granular magnetic layer, which has a structure comprising magnetic crystal grains surrounded with a nonmagnetic nonmetallic substance such as an oxide or a nitride.

For example, Japanese Patent application Laid-open No. 8-255342(1996) describes that a low noise is achieved by laminating a nonmagnetic film, a ferromagnetic film, and a nonmagnetic film sequentially on a nonmagnetic substrate, and then heat-treating the laminate to form a granular recording layer having ferromagnetic crystal grains dispersed in the nonmagnetic film. In this case, cobalt or an alloy composed mainly of cobalt is used as the magnetic layer, and a metal, an oxide, a nitride, carbon or a carbide is used as the nonmagnetic film. U.S. Pat. No. 5,679,473 describes that a granular recording layer having a structure comprising magnetic crystal grains surrounded with a nonmagnetic oxide and thereby individually separated can be formed by performing RF (radio frequency) sputtering with the use of a CoNiPt target having an oxide, such as $SiO_2$, added thereto, and that high Hc (coercive force) and low noise are realized by this recording layer.

Such a granular magnetic layer has been considered to obtain low noise characteristics for the following reason: A nonmagnetic nonmetallic grain boundary phase physically separates the magnetic grains. Thus, the magnetic interaction between the magnetic grains lowers to suppress the formation of zigzag domain walls occurring in a transition region of recording bits.

The causes of the noise in a recording medium are the size of magnetic grains constituting the medium, and fluctuations in magnetization due to magnetic interaction between the grains. To maintain high SNR consistent with an increased recording density, it is necessary to keep the number of magnetic grains per bit cell at a certain value or higher, namely, to make the magnetic grains finer. However, in a state in which a great exchange interaction works between the magnetic grains, finer crystal grains do not necessarily mean finer magnetization reversal units. Thus, in order to make the magnetization reversal unit (expressed as an activation magnetic moment) itself small, it is also necessary to suppress the exchange interaction between the grains. In making the grains finer, moreover, it is necessary to impart a certain magnitude of magnetic anisotropy energy to the magnetic grains themselves so that magnetic characteristics essential for high resolution recording (great Hc/Mrt) can be obtained without super-paramagnetism. A granular structure comprising magnetic grains with high magnetic anisotropy energy dispersed in a nonmagnetic matrix is aimed at fulfilling all of the above-described strict requirements for high SNR.

A conventionally used CoCr-based metallic magnetic layer is formed at a high temperature. Thus, Cr is segregated from Co-based magnetic grains and precipitated into the grain boundary to decrease the magnetic interaction between the magnetic grains. In the case of the granular magnetic layer, on the other hand, a nonmagnetic nonmetallic substance is used as the grain boundary phase. Thus, the advantage is obtained that Cr is segregated more easily than Cr in the conventional magnetic layer, whereby isolation of the magnetic grains can be promoted relatively easily. In particular, with the conventional CoCr-based metallic magnetic layer, raising the substrate temperature during film formation to 200° C. or higher is absolutely necessary for sufficient segregation of Cr. The granular magnetic layer, by contrast, is advantageous in that even during film formation without heating, the nonmagnetic nonmetallic substance undergoes segregation.

However, a magnetic recording medium having a granular magnetic layer requires that a relatively large amount of Pt be added to a Co alloy in order to realize the desired magnetic characteristics, especially, high coercive force Hc. The aforementioned U.S. Pat. No. 5,679,473 also needs expensive Pt as much as 11 at % in order to achieve Hc of about 2400 Oe. To realize comparable Hc by use of the conventional CoCr-based metallic magnetic layer, on the other hand, the amount of Pt required is as small as 5 at %. Generally, with granular magnetic layer Pt in an amount as large as 16 at % is needed to realize Hc of 2800 Oe. With the conventional CoCr-based metallic magnetic layer, on the other hand, the amount of Pt required is only 8 at %. In recent years, with the increase in magnetic recording density, there has been an increasing demand for Hc as high as 3,000 Oe or more. The granular magnetic layer, which requires a large amount of expensive Pt, is posing the problem of increasing the manufacturing cost. A further decrease in the medium noise is also demanded in accordance with the increase in the density. The need for meticulous control of the magnetic crystal grain size of the granular magnetic layer and a fine structure such as a segregation structure is increasing.

SUMMARY OF THE INVENTION

Extensive studies have been conducted to achieve high Hc, a low cost, and a further decrease in noise for a granular magnetic layer. These studies have clarified that high Hc and a low medium noise can be achieved without an increase in the consumption of expensive Pt, by forming a nonmagnetic metallic intermediate layer between a granular magnetic layer and a nonmagnetic undercoat layer, the nonmagnetic metallic intermediate layer comprising a nonmagnetic metal or an alloy thereof and having a crystal structure which is a hexagonal close-packed (hcp) structure.

More preferably, the nonmagnetic metallic intermediate layer is two-layered. As a result, it has been found that the mean crystal grain diameters in the magnetic layer and their variations can be made small, and more favorable results can be obtained.

Also, the use of the nonmagnetic metallic intermediate layer gives a high Hc easily. Thus, a substrate need not be heated during film formation of a medium according to the present invention. Furthermore, the manufacturing process can be simplified and performed for a low cost, and an inexpensive plastic can be used as a substrate, in addition to a conventional Al or glass substrate.

In the first aspect of the present invention, a magnetic recording medium comprising at least a nonmagnetic undercoat layer, a nonmagnetic metallic intermediate layer, a magnetic layer, a protective film, and a liquid lubricant layer sequentially laminated on a nonmagnetic substrate comprises:

the magnetic layer comprising crystal grains having ferromagnetism and nonmagnetic grain boundaries surrounding the crystal grains, and the nonmagnetic metallic intermediate layer comprising at least one layer, and a crystal structure of each layer being a hexagonal close-packed structure.

Here, the nonmagnetic metallic intermediate layer may include a layer comprising a metal selected from the group consisting of Ti, Zr, Hf, Ti alloys, Zr alloys, and Hf alloys.

The nonmagnetic metallic intermediate layer may include a layer comprising a CoCr alloy containing 30% to 50% of Cr.

The nonmagnetic metallic intermediate layer may have a structure consisting of two different layers laminated together, and one of the layers may comprise a metal selected from the group consisting of Ti, Zr, Hf, Ti alloys, Zr alloys, and Hf alloys, and the other layer may comprise a CoCr alloy containing 30% to 50% of Cr.

The nonmagnetic metallic intermediate layer may have a structure consisting of two different layers laminated together, and a lower layer of the two layers may be a layer comprising a CoCr alloy containing 30% to 50% of Cr, and an upper layer of the two layers may be a layer comprising a metal selected from the group consisting of Ti, Zr, Hf, Ti alloys, Zr alloys, and Hf alloys.

The nonmagnetic grain boundaries in the magnetic layer may comprise at least one oxide selected from the group consisting of oxides of Cr, Co, Si, Al, Ti, Ta, Hf and Zr, and the crystal grains having ferromagnetism in the magnetic layer may comprise an alloy formed by adding to a CoPt alloy at least one substance selected from the group consisting of Cr, Ni and Ta.

The nonmagnetic undercoat layer may comprise Cr or a Cr alloy.

The nonmagnetic substrate may be selected from the group consisting of crystallized glass, chemical tempered glass, and plastics.

In the second aspect of the present invention, a method for producing a magnetic recording medium comprising at least a nonmagnetic undercoat layer, a nonmagnetic metallic intermediate layer, a magnetic layer, a protective film, and a liquid lubricant layer laminated sequentially on a nonmagnetic substrate, comprises the steps of:

laminating the nonmagnetic undercoat layer on the nonmagnetic substrate;

laminating the nonmagnetic metallic intermediate layer on the nonmagnetic undercoat layer, the nonmagnetic metallic intermediate layer having a crystal structure being a hexagonal close-packed structure;

laminating the magnetic layer on the nonmagnetic metallic intermediate layer, the magnetic layer comprising crystal grains having ferromagnetism and nonmagnetic grain boundaries surrounding the crystal grains;

laminating the protective film on the magnetic layer; and laminating the liquid lubricant layer on the protective film, and wherein the respective steps are performed without prior heating of the nonmagnetic substrate.

Here, the step of laminating the nonmagnetic metallic intermediate layer may include the step of providing a layer comprising a metal selected from the group consisting of Ti, Zr, Hf, Ti alloys, Zr alloys, and Hf alloys.

The step of laminating the nonmagnetic metallic intermediate layer may include the step of providing a layer comprising a CoCr alloy containing 30% to 50% of Cr.

The step of laminating the nonmagnetic metallic intermediate layer may include the step of providing a layer comprising a metal selected from the group consisting of Ti, Zr, Hf, Ti alloys, Zr alloys, and Hf alloys, and the step of providing a layer comprising a CoCr alloy containing 30% to 50% of Cr.

The step of laminating the nonmagnetic metallic intermediate layer may include the step of providing on the nonmagnetic undercoat layer a layer comprising a CoCr alloy containing 30% to 50% of Cr, and the step of providing on the layer comprising the CoCr alloy a layer comprising a metal selected from the group consisting of Ti, Zr, Hf, Ti alloys, Zr alloys, and Hf alloys.

The nonmagnetic grain boundaries in the magnetic layer may comprise at least one oxide selected from the group consisting of oxides of Cr, Co, Si, Al, Ti, Ta, Hf and Zr, and the crystal grains having ferromagnetism in the magnetic layer may comprise an alloy formed by adding to a CoPt alloy at least one substance selected from the group consisting of Cr, Ni and Ta.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will now be described in more detail with reference to FIG. 1 and FIG. 2.

Figure 1:
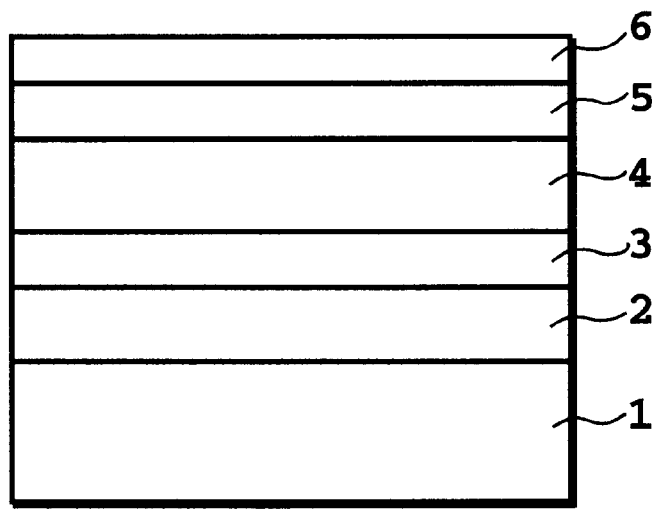
FIG. 1 is a schematic sectional view of a magnetic recording medium according to an embodiment of the present invention, in which a nonmagnetic metallic intermediate layer is a single layer.
Figure 2:
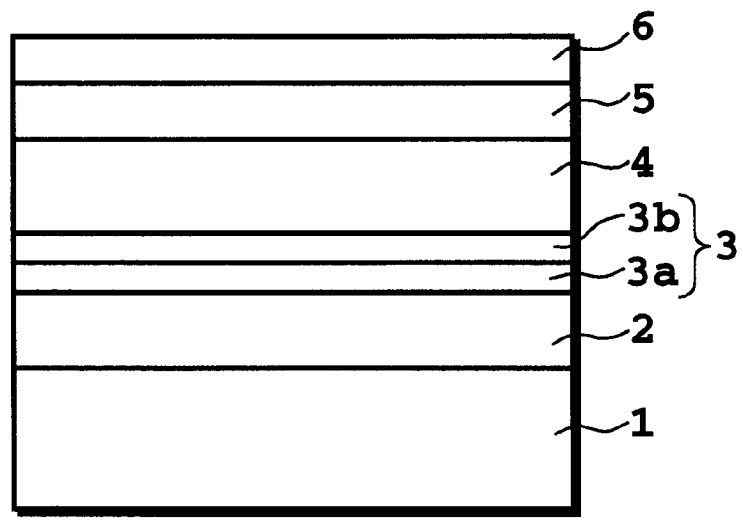
FIG. 2 is a schematic sectional view of a magnetic recording medium according to another embodiment of the present invention, in which a nonmagnetic metallic intermediate layer is two-layered.

FIG. 1 and FIG. 2 each schematically show a section of a magnetic recording medium according to an embodiment of the present invention. The magnetic recording medium shown in FIG. 1 has a structure in which a nonmagnetic undercoat layer 2, a nonmagnetic metallic intermediate layer 3, a magnetic layer 4, a protective film 5, and a liquid lubricant layer 6 are sequentially formed on a nonmagnetic substrate 1. The magnetic recording medium shown in FIG. 2 has a structure in which the nonmagnetic metallic intermediate layer 3 of the magnetic recording medium shown in FIG. 1 consists of two layers comprising different materials, a lower layer 3a and an upper layer 3b.

As the nonmagnetic substrate 1, there can be used a NiP-plated Al alloy, tempered glass, or crystallized glass which is used for an ordinary magnetic recording medium. Since the present invention needs no substrate heating, moreover, it is possible to use a substrate prepared by injection molding polycarbonate, polyolefin or other resin.

On this nonmagnetic substrate 1, the nonmagnetic undercoat layer 2 is formed by a conventional method such as electron beam evaporation or sputtering. The nonmagnetic undercoat layer 2 is composed of a nonmagnetic material including NiAl, Cr or the like. The use of Cr or a Cr alloy as the nonmagnetic undercoat layer 2 is preferred, because it enhances an effect obtained by using the nonmagnetic metallic intermediate layer 3. As the Cr alloy, CrMo, CrTi, CrV or CrW alloy is preferred. The film thickness of the nonmagnetic undercoat layer 2 is not limited, but a thickness of about 5 nm to about 50 nm is preferred to obtain satisfactory recording/reproducing characteristics.

Then, the nonmagnetic metallic intermediate layer 3 is formed on the nonmagnetic undercoat layer 2. In the magnetic recording medium of the present invention, the nonmagnetic metallic intermediate layer 3 may comprise a single layer (FIG. 1), and two layers, the lower layer 3a and the upper layer 3b (FIG. 2).

First, the single-layered nonmagnetic metallic intermediate layer 3 (FIG. 1) will be explained. This nonmagnetic metallic intermediate layer 3 is a metal or alloy whose crystal structure is a hexagonal close-packed (hcp) structure. When a CoCr alloy having the hcp structure containing about 30% to 50% of Cr is used as the nonmagnetic metallic intermediate layer 3, for example, the desired effects, high Hc, an associated decrease in the amount of Pt added, and low noise, can be obtained. When a substance selected from the group consisting of Ti, Ti alloy, Zr, Zr alloy, Hf, and Hf alloy is used as the nonmagnetic metallic intermediate layer 3 among metals or alloys having the hcp structure, maximum effect is obtained for the following reason: The nonmagnetic metallic intermediate layer 3 having the hcp structure is present during formation of the magnetic layer. Thus, the growth of ferromagnetic crystals in the magnetic layer similarly having the hcp structure becomes epitaxial growth to increase crystallinity. In addition to this effect, Ti, Zr and Hf are metals which easily take oxygen into a film, so that the initial growth of oxide grain boundaries in the magnetic layer is favorably controlled.

Such nonmagnetic metallic intermediate layer 3 can be formed by, but is not limited to, DC magnetron sputtering using the above-described material as a target. The film thickness of the nonmagnetic metallic intermediate layer 3 is not limited, but a thickness of 1 nm to 20 nm is preferred to obtain excellent magnetic characteristics.

Next, the nonmagnetic metallic intermediate layer 3 comprising a laminate of the lower layer 3a and the upper layer 3b (FIG. 2) will be explained. The different nonmagnetic metallic intermediate layers 3a and 3b to be laminated need to be metals or alloys whose crystal structure is an hcp structure. The nonmagnetic metallic intermediate layer comprising these two different layers, for example, is a laminate of two layers of different nonmagnetic metals or alloys among Ti, Ti alloys, Zr, Zr alloys, Hf, and Hf alloys having the hcp structure. Another example is the nonmagnetic metallic intermediate layer in which a layer of a metal selected from the group consisting of Ti, Ti alloy, Zr, Zr alloy, Hf, and Hf alloy is formed as the lower layer 3a, and a CoCr alloy layer containing 30% to 50% of Cr is formed as the upper layer 3b. These laminated nonmagnetic metallic intermediate layers can obtain the desired effects including high Hc, a decrease in the amount of Pt added, and low noise. When, in the two-layered nonmagnetic metallic intermediate layer 3, the lower layer 3a is formed from a CoCr alloy layer containing 30% to 50% of Cr, and the upper layer 3b is formed from a layer of a metal selected from the group consisting of Ti, Ti alloy, Zr, Zr alloy, Hf, and Hf alloy, maximum effect is obtained. The reason is as follows: The intermediate layer having the hcp structure is present during formation of the magnetic layer as in the case of the single-layer nonmagnetic metallic intermediate layer 3 (FIG. 1). Thus, the growth of ferromagnetic crystals in the magnetic layer similarly having the hcp structure becomes epitaxial growth to increase crystallinity. In addition to this effect, Ti, Zr and Hf are metals which easily take oxygen into a film, so that the initial growth of oxide grain boundaries in the magnetic layer is favorably controlled.

When the nonmagnetic metallic intermediate layer 3 is two-layered (FIG. 2), moreover, the crystallinity of the crystal grains having ferromagnetism in the magnetic layer and the initial growth of oxide grain boundaries in the magnetic layer are controlled as stated above. Besides, the crystallinity and tiny crystal grain diameters in the upper layer of the nonmagnetic metallic intermediate layer 3b in contact with the magnetic layer 4 similarly having the hcp structure are also achieved by providing one layer, the lower layer of the nonmagnetic metallic intermediate layer 3a similarly having the hcp structure. As a result, the magnetic layer 4 can be controlled more favorably.

The lower layer 3a and the upper layer 3b of the nonmagnetic metallic intermediate layer can be formed by, but is not limited to, DC magnetron sputtering using the above-described material as a target. The film thickness of each of the lower layer 3a and upper layer 3b of the nonmagnetic metallic intermediate layer is not limited, but a thickness of 1 nm to 20 nm is preferred to obtain excellent magnetic characteristics.

Then, the magnetic layer 4 is formed on the nonmagnetic metallic intermediate layer 3. The magnetic layer 4 is a granular magnetic layer comprising crystal grains having ferromagnetism and nonmagnetic grain boundaries surrounding them, the nonmagnetic grain boundaries comprising an oxide or nitride of a metal. Such a structure of the magnetic layer 4 is obtained, for example, by film formation based on sputtering using as a target a ferromagnetic metal containing an oxide which constitutes nonmagnetic grain boundaries. Alternatively, the granular-structure magnetic layer 4 can be obtained by film formation based on reactive sputtering in an oxygen-containing Ar gas with the use of a ferromagnetic metal as a target. However, these methods are not restrictive. By providing the above-mentioned nonmagnetic metallic intermediate layer 3, the magnetic layer 4 can be formed without the need to preheat the nonmagnetic substrate 1.

As a material constituting the crystals having ferromagnetism, a CoPt-based alloy is preferably used, but it is not limited. Particularly, the addition, to CoPt alloy, of at least one substance selected from the group consisting of Cr, Ni and Ta is desirable for decreasing the medium noise, and the effect attributed to the provision of the nonmagnetic metallic intermediate layer 3 in the present invention is most pronounced. At least one oxide selected from the group consisting of oxides of Cr, Co, Si, Al, Ti, Ta, Hf and Zr is used as the material constituting the nonmagnetic grain boundaries. This use is particularly preferred for formation of a stable granular structure. The film thickness of the magnetic layer is not limited, but needs to be such a thickness as to obtain sufficient head regeneration output during recording and regeneration.

Then, the protective film 5 and the liquid lubricant layer 6 are sequentially formed on the magnetic layer 4. As the protective film 5 and the liquid lubricant layer 6, conventional ones can be used. For example, a thin film consisting essentially of carbon is used as the protective film 5, and a perfluoropolyether-based lubricant can be used as the liquid lubricant layer 6, but these are not limited. The protective film 5 can be formed by a conventional method such as sputtering, while the liquid lubricant layer 6 can be formed by a conventional method such as application of a liquid lubricant.

The so prepared magnetic recording medium of the present invention having the above-described laminate structure can attain high Hc and a low medium noise, even without a substrate heating step, as in the production of a conventional magnetic recording medium, during the manufacturing process. Thus, a decrease in the manufacturing cost associated with simplification of the manufacturing process can be achieved.

EXAMPLES

The magnetic recording medium of the present invention will now be described in more detail by way of Examples and Comparative Examples.

Examples 1 to 4 and Comparative Examples 1 to 3

A smooth-surface chemical tempered glass substrate (glass substrate N-10 manufactured by HOYA Co.) was used as a nonmagnetic substrate 1. This glass substrate was washed, and then introduced into a sputtering device. DC magnetron sputtering using an Mo-containing Cr alloy target was performed under an Ar gas pressure of 5 mTorr, without heating of the substrate, to form a nonmagnetic undercoat layer 2 with a film thickness of 15 nm comprising Cr-20 at %Mo (a Cr alloy containing 20 at % of Mo).

Then, a target of each of the following compositions:

Ti (Example 1);
Zr (Example 2);
Ti-10 at %Cr (Example 3);
Co-40 at %Cr (Example 4);
Cr (Comparative Example 1); and
Ni-50 at %Al (Comparative Example 2)

was subjected to DC magnetron sputtering under an Ar gas pressure of 5 mTorr to form a nonmagnetic metallic intermediate layer 3 of the same composition as the target, with the film thickness varied in the range of from more than 0 to 20 nm. Separately, an example, in which the film thickness of the nonmagnetic metallic intermediate layer 3 was zero, namely, the nonmagnetic metallic intermediate layer 3 was not formed, was provided as Comparative Example 3.

Then, a granular magnetic layer 4 with a film thickness of 20 nm was formed on the nonmagnetic metallic intermediate layer 3 or the nonmagnetic undercoat layer 2 (Comparative Example 3) by sputtering under an Ar gas pressure of 3 mTorr with the use of a $CoCr_{12}Pt_{12}$ target containing 10 mol % of $SiO_2$. The Pt content of the magnetic layer was about 11%.

Then, a carbon protective film 5 with a film thickness of 10 nm was laminated on the granular magnetic layer 4 by sputtering, and the laminate was taken out of the sputtering device in vacuum.

Then, a liquid lubricant comprising perfluoropolyether was coated on the carbon protective film 5 to form a liquid lubricant layer 6 with a film thickness of 1.5 nm.

In this manner, magnetic recording media as shown in FIG. 1 were prepared.

Heating of the nonmagnetic substrate 1 had not been performed prior to the foregoing film formation.

Figure 3:
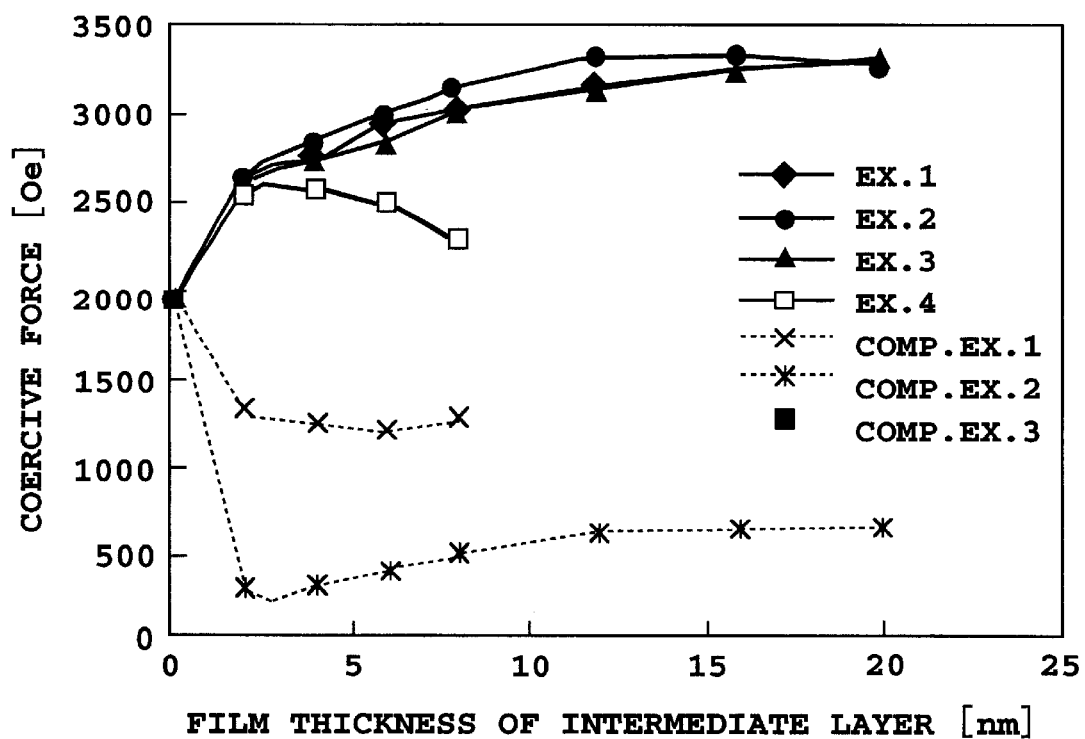
FIG. 3 is a graph showing changes in coercive force Hc (Oe) in accordance with changes in film thickness (nm) in nonmagnetic metallic intermediate layers having various compositions.

FIG. 3 shows changes in the coercive force Hc in accordance with changes in the film thickness of each of the nonmagnetic metallic intermediate layers. The product of the residual flux density and the film thickness, i.e., Brδ, of each of the magnetic recording media was between 67 G$\mu$m and 73 G$\mu$m, except for 91 G$\mu$m of the medium without the nonmagnetic metallic intermediate layer (Comparative Example 3).

The values of the Hc and Brδ shown here were all measured with a vibration sample magnetometer (VSM).

FIG. 3 shows that Hc in the absence of the nonmagnetic metallic intermediate layer (Comparative Example 3) was about 2,000 Oe, while the provision of 2 to 6 nm thick nonmagnetic Co-40 at %Cr layer having the hcp structure as the nonmagnetic metallic intermediate layer resulted in Hc as high as about 2,500 Oe or more as in Example 4. When Ti, Zr and Ti-10 at %Cr being nonmagnetic metals or an alloy and having the hcp structure were each provided as the nonmagnetic metallic intermediate layer, it is found that Hc increased markedly with increasing thickness of the intermediate layer and reached to about 3,300 Oe, as in Examples 1 to 3. When Cr and Ni-50 at %Al, materials having a crystal structure which is not the hcp structure, i.e., a body centered cubic lattice structure, were each provided as the nonmagnetic metallic intermediate layer 3, sharp decreases in Hc were observed, as in Comparative Examples 1 and 2. As these findings show, very high Hc can be obtained when a nonmagnetic metal having the hcp structure, especially, Ti, Zr, Hf, or an alloy thereof, is used as the nonmagnetic metallic intermediate layer 3.

Examples 5 to 10 and Comparative Examples 4 to 7

Magnetic recording media as shown in FIG. 1 were produced in the same manner as in Example 1, except that each of the following nonmagnetic materials:

Ti (Example 5);
Zr (Example 6);
Hf (Example 7);
Ti-10 at %Cr (Example 8);
Zr-10 at %Cr (Example 9);
Co-40 at %Cr (Example 10);
no intermediate layer (Comparative Example 3);
Cr (Comparative Example 4);
Ni-50 at %Al (Comparative Example 5);
Cu (Comparative Example 6); and
Ni-20 at %P (Comparative Example 7)

was formed as the nonmagnetic metallic intermediate layer 3 under an Ar gas pressure of 5 mTorr to a film thickness of 4 nm.

The resulting magnetic recording media were each measured for coercive force Hc and the product of the residual flux density and the film thickness, Brδ, by means of VSM; regeneration output of an isolated regeneration waveform by means of a spin stand tester using a GMR head; and medium noise and signal-to-noise ratio (SNR) based on linear recording density 270 kFCl. The results obtained are shown in Table 1.

intermediate layer 3 was not formed, was provided as Comparative Example 8.

Then, a granular magnetic layer 4 with a film thickness of 20 nm was formed on the nonmagnetic metallic intermediate layer 3 or the nonmagnetic undercoat layer 2 (Comparative Example 8) by RF sputtering under an Ar gas pressure of 5

TABLE 1

|  | Composition of Intermediate layer | Crystal structure | Hc (Oe) | Br δ (G$\mu$m) | Regeneration output (mVp-p) | Medium noise ($\mu$V) | SNR (dB) |
| --- | --- | --- | --- | --- | --- | --- | --- |
| Example 5 | Ti | hcp | 2740 | 71 | 1.401 | 71.32 | 19.84 |
| Example 6 | Zr | hcp | 2850 | 69 | 1.389 | 72.29 | 19.65 |
| Example 7 | Hf | hcp | 2730 | 72 | 1.421 | 76.54 | 19.35 |
| Example 8 | Ti-10 at % Cr | hcp | 2750 | 68 | 1.413 | 74.94 | 19.49 |
| Example 9 | Zr-10 at % Cr | hcp | 2770 | 72 | 1.433 | 78.67 | 19.19 |
| Example 10 | Co-40 at % Cr | hcp | 2570 | 70 | 1.377 | 84.56 | 18.21 |
| Comparative Example 3 | No intermediate layer | — | 1950 | 91 | 1.678 | 131.33 | 16.11 |
| Comparative Example 4 | Cr | bcc | 1260 | 70 | 1.379 | 208.62 | 10.38 |
| Comparative Example 5 | Ni-50 at % Al | bcc | 320 | 71 | 1.409 | 252.7 | 8.91 |
| Comparative Example 6 | Cu | fcc | 1760 | 71 | 1.392 | 168.33 | 12.33 |
| Comparative Example 7 | Ni-20 at % P | Amorphous | 2750 | 70 | 1.425 | 121.15 | 15.39 |

When the nonmagnetic metallic intermediate layer 3 was not formed (Comparative Example 3), the Hc was about 2,000 Oe as stated earlier, and the SNR was 16.11 dB. When the nonmagnetic Co-40 at %Cr layer having the hcp structure was formed with a film thickness of 4 nm (Example 10), on the other hand, the Hc increased, and the SNR value also increased greatly to 18.21 dB.

When the nonmagnetic metals having the hcp structure, Ti (Example 5), Zr (Example 6), and Hf (Example 7), were each provided as the nonmagnetic metallic intermediate layer 3, further increases in the Hc and SNR were observed. The SNR values were about 19.3 to 19.8 dB.

Similar increases in the Hc and SNR also were noted with the use of Ti-10 at %Cr (Example 8) and Zr-10 %Cr (Example 9) which are alloys containing Ti or Zr and having the hcp structure.

By contrast, when materials having a crystal structure being a body centered cubic (bcc) lattice structure or a face centered cubic (fcc) lattice structure were each formed as the nonmagnetic metallic intermediate layer 3 (Comparative Examples 4 to 6), the Hc and SNR deteriorated badly. When NiP of an amorphous structure was formed as the nonmagnetic metallic intermediate layer 3 (Comparative Example 7), the Hc increased compared with the absence of the intermediate layer, but the SNR was not improved.

Examples 11 and 12 and Comparative Example 8

A smooth-surface chemical tempered glass substrate (glass substrate N-10 manufactured by HOYA Co.) was used as a nonmagnetic substrate 1. This glass substrate was washed, and then introduced into a sputtering device. DC magnetron sputtering using a W-containing Cr alloy target was performed under an Ar gas pressure of 25 mTorr, without heating of the substrate, to form a nonmagnetic undercoat layer 2 with a film thickness of 8 nm comprising Cr-16 at %W.

Then, targets of the compositions of Ti-10 at %Cr (Example 11) and Co-40 at %Cr (Example 12) were each subjected to DC magnetron sputtering under an Ar gas pressure of 25 mTorr to form a nonmagnetic metallic intermediate layer 3 of the same composition as the target, with the film thickness varied in the range of from more than 0 to 12 nm. Separately, an example, in which the film thickness of Ti-10 at %Cr was zero, namely, the nonmagnetic metallic mTorr with the use of a $CoCr_{10}Pt_{16}$ target containing 6 mol % of $SiO_2$. The Pt content of the magnetic layer was about 16 at %.

Then, a carbon protective film 5 with a film thickness of 10 nm was laminated on the granular magnetic layer 4 by sputtering, and the laminate was taken out of the sputtering device in vacuum.

Then, a liquid lubricant comprising perfluoropolyether was coated on the carbon protective film 5 to form a liquid lubricant layer 6 with a film thickness of 1.5 nm.

In this manner, magnetic recording media as shown in FIG. 1 were prepared. The resulting magnetic recording media were each measured for coercive force Hc and the product of the residual flux density and the film thickness, Brδ, by means of a vibration sample magnetometer VSM; regeneration output of an isolated regeneration waveform by means of a spin stand tester using a GMR head; and medium noise and signal-to-noise ratio (SNR) based on linear recording density 270 kFCl. Table 2 shows the results of measurements of the magnetic recording media in which the film thickness of the nonmagnetic metallic intermediate layer 3 was 8 nm (0 nm in Comparative Example 8).

Figure 4:
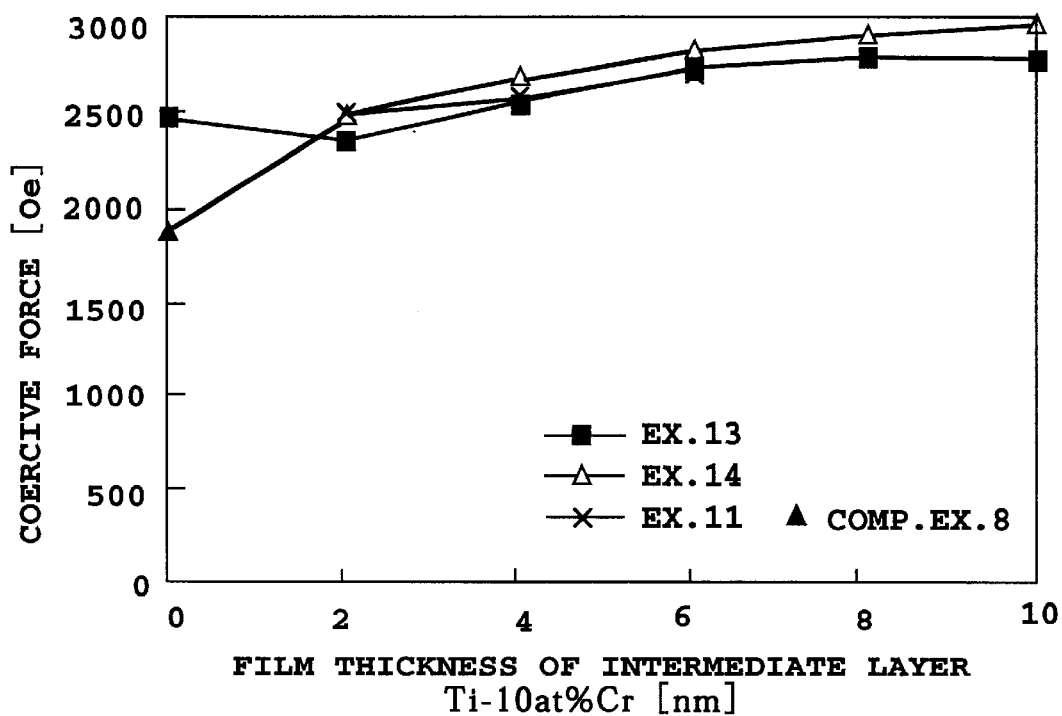
FIG. 4 is a graph showing changes in coercive force Hc in accordance with changes in the film thickness of Ti-10 at %Cr as a nonmagnetic metallic intermediate layer of a magnetic recording medium formed by using $CoCr_{10}Pr_{16}$ as a magnetic layer target.

FIG. 4 shows changes in the coercive force Hc when the film thickness of the nonmagnetic metallic intermediate layer 3 comprising Ti-10 at %Cr was varied in Comparative Example 8 and Example 11.

Example 13

In the present example, a magnetic recording medium, in which the nonmagnetic metallic intermediate layer 3 of Example 11 or Example 12 consisted of two layers, was produced.

A smooth-surface chemical tempered glass substrate (glass substrate N-10 manufactured by HOYA Co.) was used as a nonmagnetic substrate 1. This glass substrate was washed, and then introduced into a sputtering device. DC magnetron sputtering using a W-containing Cr alloy target was performed under an Ar gas pressure of 25 mTorr, without heating of the substrate, to form a nonmagnetic undercoat layer 2 with a film thickness of 8 nm comprising Cr-16at %W.

Then, a target of the composition of Ti-10 at %Cr was subjected to DC magnetron sputtering under an Ar gas pressure of 25 mTorr to form a lower layer of nonmagnetic metallic intermediate layer 3a, of the same composition as the target, with the film thickness varied in the range of from 0 to 12 nm. Similarly, a target of the composition of Co-40 at %Cr was used to form an upper layer of nonmagnetic metallic intermediate layer 3b, having the same composition as the target and having a film thickness of 4 nm. In this manner, a nonmagnetic metallic intermediate layer 3 consisting of the two layers, was provided.

Then, a granular magnetic layer 4 with a film thickness of 20 nm was formed on the nonmagnetic metallic intermediate layer 3 by RF sputtering under an Ar gas pressure of 5 mTorr with the use of a $CoCr_{10} Pt_{16}$ target containing 6 mol % of $SiO_2$. The Pt content of the magnetic layer was 16 at %.

Then, a carbon protective film 5 with a film thickness of 10 nm was laminated on the granular magnetic layer 4 by sputtering, and the laminate was taken out of the sputtering device in vacuum.

Then, a liquid lubricant comprising perfluoropolyether was coated on the carbon protective film 5 to form a liquid lubricant layer 6 with a film thickness of 1.5 nm.

In this manner, magnetic recording media as shown in FIG. 2 were prepared. The resulting magnetic recording media were each measured for the product of the residual flux density and the film thickness, Brδ, and coercive force Hc by means of a vibration sample magnetometer (VSM). The product of the residual flux density and the film thickness, Brδ, ranged between 67 and 73 G$\mu$m. FIG. 4 shows changes in the coercive force Hc in accordance with changes in the film thickness of Ti-10 at %Cr as the lower layer of the nonmagnetic metallic intermediate layer 3a.

Furthermore, the respective magnetic recording media were each measured for the coercive force Hc and the product of the residual flux density and the film thickness, Brδ, by means of VSM; regeneration output of an isolated regeneration waveform by means of a spin stand tester using a GMR head; and medium noise and signal-to-noise ratio (SNR) based on linear recording density 270 kFCl. Table 2 shows the results of measurements of the magnetic recording media in which the film thickness of Ti-10 at %Cr as the lower layer 3a was 8 nm.

Examples 14 to 17

Magnetic recording media as shown in FIG. 2 were produced in the same manner as in Example 13, except that a target of the composition Co-40at %Cr was subjected to DC magnetron sputtering to form a lower layer of a nonmagnetic metallic intermediate layer 3a of the same composition as the target and with a film thickness of 4 nm, and then a target of each of the following compositions:

Ti-10 at %Cr (Example 14);

Ti (Example 15);

Zr (Example 16); and

Hf (Example 17)

was used to form an upper layer of nonmagnetic metallic intermediate layer 3b on the lower layer 3a, the upper layer 3b having the same composition as the target and having a film thickness varied in the range of 0 to 12 nm, whereby the nonmagnetic metallic intermediate layer 3 was formed.

The resulting magnetic recording media were measured for the respective properties in the same manner as in Example 13. Table 2 shows the properties of the magnetic recording media in which the film thickness of the upper layer of the nonmagnetic metallic intermediate layer 3b was 8 nm. In connection with Example 14, FIG. 4 shows the coercive force Hc associated with the film thickness of Ti-10 at %Cr as the upper layer of the nonmagnetic metallic intermediate layer 3a, along with the results of Examples 11 and 13. The values of Hc and Brδ of these magnetic recording media ranged between 67 and 73 Gm.

FIG. 4 shows that the Hc was about 1,950 Oe in the absence of the nonmagnetic metallic intermediate layer 3 (Comparative Example 8), while Hc of more than about 2,500 Oe was obtained by providing a 2 to 6 nm thick single layer of Ti-10 at %Cr as the nonmagnetic metallic intermediate layer 3 (Example 11). In Examples 13 and 14, in which the nonmagnetic metallic intermediate layer 3 consisted of the two layers, the lower layer 3a and the upper layer 3b, however, even higher coercive force was found to be obtained. Particularly in Example 14 provided with the nonmagnetic metallic intermediate layer 3 having Co-40at %Cr as the lower layer 3a and Ti-10 at %Cr as the upper layer 3b, high coercive force Hc of about 3,000 Oe was found to be obtained. Such increases in the coercive force Hc were true of the provision of Ti (Example 15), Zr (Example 16) and Hf (Example 17) as the upper layer of the nonmagnetic metallic intermediate layer 3b.

Example 18

A magnetic recording medium as shown in FIG. 1 was produced in the same manner as in Example 11, except that the magnetic layer 4 was formed using a $CoCr_{10} Pt_{12}$ target incorporating 6 mol % of $SiO_2$, instead of the $CoCr_{10} Pt_{16}$ target incorporating 6 mol % of $SiO_2$ that was used in Example 11. The Pt content of the magnetic layer was 12 at %.

Figure 5:
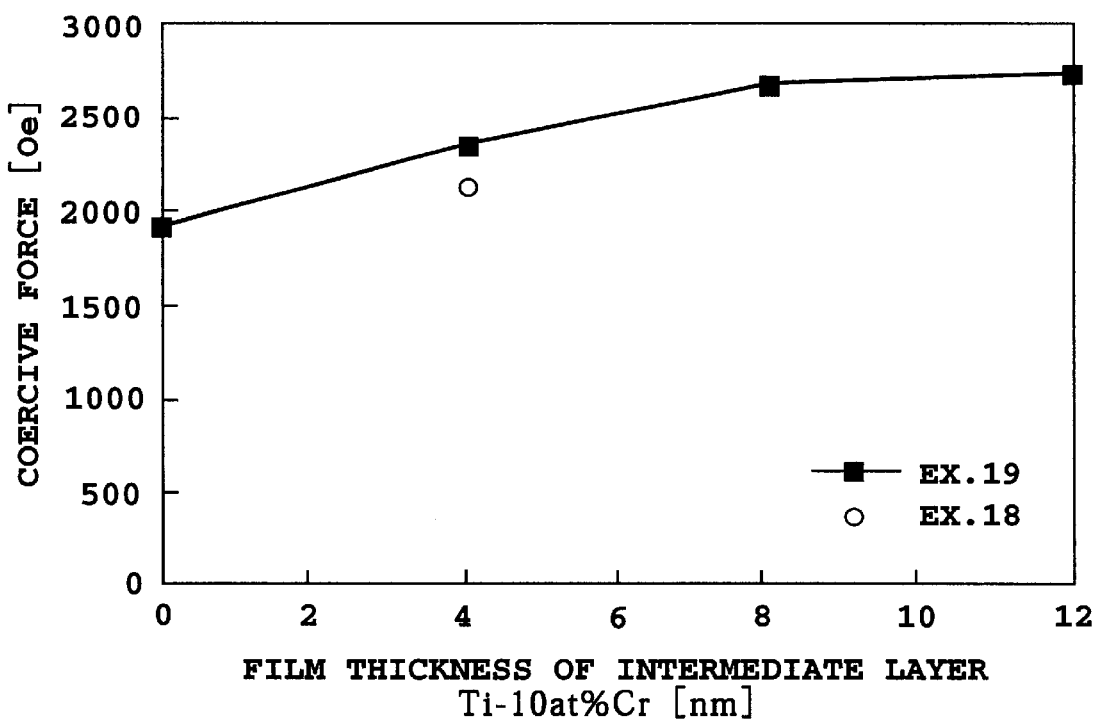
FIG. 5 is a graph showing changes in coercive force Hc in accordance with changes in the film thickness of Ti-10 at %Cr as a nonmagnetic metallic intermediate layer of a magnetic recording medium formed by using $CoCr_{10}Pr_{12}$ as a magnetic layer target.

The resulting magnetic recording medium was measured for the respective properties in the same manner as in Example 11. FIG. 5 shows the coercive force of the magnetic recording medium in which the film thickness of the nonmagnetic metallic intermediate layer 3 was 4 nm. Table 2 shows the magnetic characteristics when the film thickness of the nonmagnetic metallic intermediate layer 3 was 4 nm.

Example 19

A magnetic recording medium as shown in FIG. 2 was produced in the same manner as in Example 14, except that the magnetic layer 4 was formed using a $CoCr_{10} Pt_{12}$ target incorporating 6 mol % of $SiO_2$, instead of the $CoCr_{10} Pt_{16}$ target incorporating 6 mol % of $SiO_2$ that was shown in Example 14. The Pt content of the magnetic layer was 12 at %.

The resulting magnetic recording medium was measured for the respective properties in the same manner as in Example 13. Table 2 shows the properties when the film thickness of the upper layer of the nonmagnetic metallic intermediate layer 3b was 8 nm. FIG. 5 shows changes in the coercive force Hc in accordance with changes in the film thickness of Ti-10 at %Cr as the upper layer of the nonmagnetic metallic intermediate layer 3b.

As shown in FIG. 5 and Table 2, the coercive force Hc was 2,134 Oe with the use of the Ti-10 at %Cr single layer (Example 18) even when the Pt content decreased. This Hc value was more than the Hc value when the nonmagnetic metallic intermediate layer was not provided (Comparative Example 8). In Example 19 in which the nonmagnetic metallic intermediate layer 3 was two-layered by providing Co-40at %Cr as the lower layer 3a, moreover, the coercive force Hc was 2,748 Oe indicating a marked increase.

It is also seen that the increase in the coercive force when the nonmagnetic metallic intermediate layer was changed from a single layer to a two-layered structure and the magnetic layer was formed with the use of the $CoCr_{10}Pt_{12}$ target was greater (about 600 Oe) than the increase in the coercive force when the nonmagnetic metallic intermediate layer was changed from a single layer to a two-layered structure and the magnetic layer was formed with the use of the $CoCr_{10}Pt_{16}$ target having a larger Pt content.

Comparative Example 9

A magnetic recording medium as shown in FIG. 2 was produced in the same manner as in Example 13, except that a layer comprising Cr and having a crystal structure being a body centered cubic (bcc) lattice structure was provided as the lower layer of the nonmagnetic metallic intermediate layer 3a, and a layer comprising Ti-10 at %Cr and having a crystal structure being the hcp was provided as the upper layer 3b. The resulting magnetic recording medium was measured for the respective properties in the same manner as in Example 13. Table 2 shows the properties when the film thickness of the lower layer 3a was 4 nm and the film thickness of the upper layer 3b was 8 nm.

both of high Hc and low noise in comparison with the medium having the single nonmagnetic metallic intermediate layer.

Similar effects were noted with the nonmagnetic metals Ti (Example 15), Zr (Example 16) and Hf (Example 17) having the hcp structure. That is, the Hc was increased, and the SNR was as high as about 10.7 dB.

When a nonmagnetic metallic intermediate layer material having a crystal structure other than the above-mentioned hcp (i.e., bcc or fcc) was incorporated even as a single layer (Comparative Example 9), the magnetic characteristics and SNR deteriorated considerably.

Even when a $CoCr_{10}Pt_{12}$ target incorporating 6 mol % of $SiO_2$ and having a decreased Pt content was used as a magnetic layer target, the coercive force and SNR obtained were higher than in the magnetic recording medium, in which the magnetic layer was formed using a $CoCr_{10}Pt_{16}$ target without providing the nonmagnetic metallic intermediate layer (Comparative Example 8), if a single nonmagnetic metallic intermediate layer of Ti-10 at %Cr was provided (Example 18). In the magnetic recording medium,

TABLE 2

| | Structure of intermediate layer | Composition of Intermediate layer | Crystal structure | Hc (Oe) | Br δ (G$\mu$m) | Regeneration output (mVp-p) | Medium noise ($\mu$V) | SNR (dB) |
|---|---|---|---|---|---|---|---|---|
| Example 11 | Single layer | Ti-10 at % Cr | hcp | 2518 | 71 | 0.874 | 37.78 | 9.94 |
| Example 12 | Single layer | Co-40 at % Cr | hcp | 2201 | 71 | 1.039 | 55.61 | 8.12 |
| Example 13 | Upper layer | Co-40 at % Cr | hcp | 2769 | 69 | 0.866 | 36.22 | 10.65 |
| | Lower layer | Ti-10 at % Cr | hcp | | | | | |
| Example 14 | Upper layer | Ti-10 at % Cr | hcp | 2951 | 68 | 0.872 | 36.46 | 10.81 |
| | Lower layer | Co-40 at % Cr | hcp | | | | | |
| Example 15 | Upper layer | Ti | hcp | 2902 | 72 | 0.881 | 37.33 | 10.72 |
| | Lower layer | Co-40 at % Cr | hcp | | | | | |
| Example 16 | Upper layer | Zr | hcp | 2880 | 70 | 0.886 | 38.24 | 10.79 |
| | Lower layer | Co-40 at % Cr | hcp | | | | | |
| Example 17 | Upper layer | Hf | hcp | 2868 | 73 | 0.888 | 38.52 | 10.78 |
| | Lower layer | Co-40 at % Cr | hcp | | | | | |
| Example 18 | Single layer | Ti-10 at % Cr | hcp | 2134 | 73 | 1.012 | 53.42 | 9.02 |
| Example 19 | Upper layer | Ti-10 at % Cr | hcp | 2748 | 71 | 0.912 | 34.24 | 11.21 |
| | Lower layer | Co-40 at % Cr | hcp | | | | | |
| Comparative Example 8 | Single layer | No intermediate layer | — | 1950 | 91 | 1.122 | 132.45 | 7.73 |
| Comparative Example 9 | Upper layer | Ti-10 at % Cr | hcp | 2301 | 71 | 0.862 | 73.89 | 8.32 |
| | Lower layer | Cr | bcc | | | | | |

Table 2 shows that in the absence of the intermediate layer (Comparative Example 8), the Hc was only 1,950 Oe as stated earlier, and the SNR was 7.73 dB. In the presence of the nonmagnetic metallic intermediate layer 3 which was a 8 nm thick single layer of Ti-10 at %Cr or Co-40at %Cr having the hcp structure (Example 11 and Example 12), the Hc was 2,201 Oe indicating an increase of about 500 Oe, and the SNR also slightly increased to 8.12 dB, in the case of Co-40at %Cr. With Ti-10 at %Cr, the Hc was about 2,500 Oe indicating a marked increase, and the SNR was also as high as 9.94 dB.

With the magnetic recording medium, in which the nonmagnetic metallic intermediate layer consisted of the two layers, the lower layer 3a being 8 nm thick Ti-10 at %Cr and the upper layer 3b being 4 nm thick Co-40at %Cr (Example 13), the Hc was 2,769 Oe indicating not so great increase compared with the medium having the single nonmagnetic metallic intermediate layer, but the SNR was 10.65 dB indicating a marked noise decrease expressed as +1 dB.

In the magnetic recording medium, in which the lower layer 3a was 4 nm thick Co-40at %Cr and the upper layer 3b was 8 nm thick Ti-10 at %Cr (Example 14), the Hc was 2,951 Oe, and the SNR was 10.81 dB, proving effective for in which 4 nm thick Co-40at %Cr was formed as the lower layer, and 8 nm thick Ti-10 at %Cr was formed as the upper layer as in Example 14 (Example 19), the Hc was 2,748 Oe indicating a marked increase, and the SNR was 11.21 dB reflecting a low Pt content. Based on Example 19, a further increase in Hc attributed to the two-layered nonmagnetic metallic intermediate layer was greater when the Pt content of the magnetic layer was lower.

According to the present invention, as described above, high Hc and a low medium noise can be achieved by forming the nonmagnetic metallic intermediate layer between the granular magnetic layer and the nonmagnetic undercoat layer, the nonmagnetic metallic intermediate layer comprising a material selected from nonmagnetic metals or alloys thereof and having a crystal structure which is the hcp structure, especially a material selected from the group consisting of Ti, Ti alloys, Zr, Zr alloys, Hf and Hf alloys.

Furthermore, the nonmagnetic metallic intermediate layer is two-layered, whereby higher Hc and lower noise can be achieved. In addition, high Hc is obtained easily, even when the Pt content of the magnetic layer target is decreased. Thus, an ever lower noise associated with a low Pt content can be realized.

Besides, the effect resulting from the provision of the nonmagnetic metallic intermediate layer can be enhanced by using at least one oxide selected from the group consisting of oxides of Cr, Co, Si, Al, Ti, Ta, Hf and Zr, as the nonmagnetic metallic substance in the granular magnetic layer; using an alloy comprising a CoPt alloy and at least one substance added thereto which is selected from the group consisting of Cr, Ni and Ta, as ferromagnetic crystals contained in the granular magnetic layer; and using Cr or a Cr alloy as the nonmagnetic undercoat layer. In addition, coercive force can be increased without increasing the amount of Pt contained in a conventional granular magnetic layer.

Additionally, high Hc can be easily obtained without the need to heat the nonmagnetic substrate during film formation of the medium of the present invention by using the nonmagnetic metallic intermediate layer 3. Thus, an inexpensive plastic can also be used as the substrate, in addition to an Al or glass substrate as used in the conventional technologies.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic recording medium, comprising:
   a nonmagnetic substrate;
   a nonmagnetic undercoat layer provided on the nonmagnetic substrate;
   a nonmagnetic metallic intermediate layer which is provided to be directly contacted on the nonmagnetic undercoat layer and which is comprised of at least one layer for which each layer has a crystal structure which is a hexagonal close-packed structure;
   a magnetic layer which is provided to be directly contacted on the nonmagnetic metallic intermediate layer and which is comprised of crystal grains having ferromagnetism and nonmetal nonmagnetic grain boundaries surrounding the crystal grains;
   a protective film provided on the magnetic layer; and
   a liquid lubricant layer provided on the protective film,
   wherein the nonmagnetic metallic intermediate layer includes a layer comprised of a metal selected from the group consisting of Ti, Zr, Hf, Ti alloys, Zr alloy, and Hf alloys.

2. The magnetic recording medium as claimed in claim 1, wherein the nonmagnetic metallic intermediate layer has a structure consisting of two different layers which are laminated together, one layer of the two different layers being comprised of a metal selected from the group consisting of Ti, Zr, Hr, Ti alloys, Zr alloys, and Hf alloys, and another layer of the two different layers being comprised of a CoCr alloy containing from 30 at % to 50 at % of Cr.

3. The magnetic recording medium as claimed in claim 2, wherein the nonmagnetic metallic intermediate layer has a structure consisting of two different layers laminated together, a lower layer of the two different layers being comprised of a CoCr alloy containing from 30 at % to 50 at % of Cr, and an upper layer of the two different layers being comprised of a metal selected from the group consisting of Ti, Zr, Hf, Ti alloys, Zr alloys, and Hf alloys.

4. The magnetic recording medium as claimed in claim 1, wherein the nonmetal nonmagnetic grain boundaries in the magnetic layer comprise at least one oxide selected from the group consisting of oxides of Cr, Co, Si, Al, Ti, Ta, Hf and Zr, and wherein the crystal grains having ferromagnetism in the magnetic layer comprise an alloy formed by adding to a CoPt alloy at least one substance selected from the group consisting of Cr, Ni and Ta.

5. The magnetic recording medium as claimed in claim 3, wherein the nonmetal nonmagnetic grain boundaries in the magnetic layer comprise at least one oxide selected from the group consisting of oxides of Cr, Co, Si, Al, Ti, Ta, Hf and Zr, and wherein the crystal grains having ferromagnetism in the magnetic layer comprise an alloy formed by adding to a CoPt alloy at least one substance selected from the group consisting of Cr, Ni and Ta.

6. The magnetic recording medium as claimed in claim 3, wherein the nonmetal nonmagnetic grain boundaries in the magnetic layer comprise at least one oxide selected from the group consisting of oxides of Cr, Co, Si, Al, Ti, Ta, Hf and Zr, and wherein the crystal grains having ferromagnetism in the magnetic layer comprise an alloy formed by adding to a CoPt alloy at least one substance selected from the group consisting of Cr, Ni and Ta.

7. The magnetic recording medium as claimed in claim 1, wherein the nonmagnetic undercoat layer comprises one of Cr or a Cr alloy.

8. The magnetic recording medium as claimed in claim 1, wherein the nonmagnetic substrate is selected from the group consisting of crystallized glass, chemical tempered glass, and plastics.

9. A method for producing a magnetic recording medium comprised of a nonmagnetic substrate; a nonmagnetic undercoat layer provided on the nonmagnetic substrate; a nonmagnetic metallic intermediate layer which is provided to be directly contacted on the nonmagnetic undercoat layer and which is comprised of at least one layer for which each layer has a crystal structure which is a hexagonal close-packed structure; a magnetic layer which is provided to be directly contacted on the nonmagnetic metallic intermediate layer and which is comprised of crystal grains having ferromagnetism and nonmetal nonmagnetic grain boundaries surrounding the crystal grains; a protective film provided on the magnetic layer; and a liquid lubricant layer provided on the protective film, the method comprising the steps of:
   providing the nonmagnetic substrate; laminating the nonmagnetic undercoat layer on the nonmagnetic substrate;
   laminating the nonmagnetic metallic intermediate layer on the nonmagnetic undercoat layer, the nonmagnetic metallic intermediate layer including a layer comprised of a metal selected from the group consisting of Ti, Zr, Hf, Ti alloys, Zr alloys, and Hf alloys;
   laminating the magnetic layer on the nonmagnetic metallic intermediate layer; laminating the protective film on the magnetic layer; and
   laminating the liquid lubricant layer on the protective film,
   wherein the steps are performed without prior heating of the nonmagnetic substrate, respectively.

10. The method for producing a magnetic recording medium as claimed in claim 9, wherein the nonmagnetic metallic intermediate layer consists of two different layers which are laminated together adjacently and wherein the two different layers are formed by, during laminating the nonmagnetic metallic intermediate layer, providing a metal layer comprised of metal selected from the group consisting of Ti, Zr, Hf, Ti alloys, Zr alloys, and Hf alloys, and providing an alloy layer comprised of a CoCr alloy containing from 30 at % to 50 at % Cr.

11. The method for producing a magnetic recording medium as claimed in claim 9, wherein the nonmagnetic metallic intermediate layer consists of two different layers which are laminated together adjacently, and where the two different layers are formed by, during laminating the nonmagnetic metallic intermediate layer, forming adjacently on the nonmagnetic undercoat layer an alloy layer comprised of a CoCr alloy containing from 30 at % to 50 at % of Cr, and forming adjacently on the alloy layer a metal layer comprised of a metal selected from the group consisting of Ti, Zr, Hf, Ti alloys, Zr alloys, and Hf alloys.

12. The method for producing a magnetic recording medium as claimed in claim 9, wherein the nonmetal nonmagnetic grain boundaries in the magnetic layer comprise at least one oxide selected from the group consisting of oxides of Cr, Co, Si, Al, Ti, Ta, Hf and Zr, and the crystal grains having ferromagnetism in the magnetic layer comprise an alloy formed by adding to a CoPt alloy at least one substance selected from the group consisting of Cr, Ni and Ta.

13. The method for producing a magnetic recording medium as claimed in claim 10, wherein the nonmagnetic grain boundaries in the magnetic layer comprise at least one oxide selected from the group consisting of oxides of Cr, Co, Si, Al, Ti, Ta, Hf and Zr, and the crystal grains having ferromagnetism in the magnetic layer comprise an alloy formed by adding to a CoPt alloy at least one substance selected from the group consisting of Cr, Ni and Ta.

14. The method for producing a magnetic recording medium as claimed in claim 11, wherein the nonmagnetic grain boundaries in the magnetic layer comprise at least one oxide selected from the group consisting of oxides of Cr, Co, Si, Al, Ti, Ta, Hf and Zr, and the crystal grains having ferromagnetism in the magnetic layer comprise an alloy formed by adding to a CoPt alloy at least one substance selected from the group consisting of Cr, Ni and Ta.

* * * * *